June 24, 1930.  P. THOMAS ET AL  1,768,274
INDUCTANCE DEVICE FOR LOADING PHANTOM CIRCUITS
Filed April 23, 1927  2 Sheets-Sheet 1
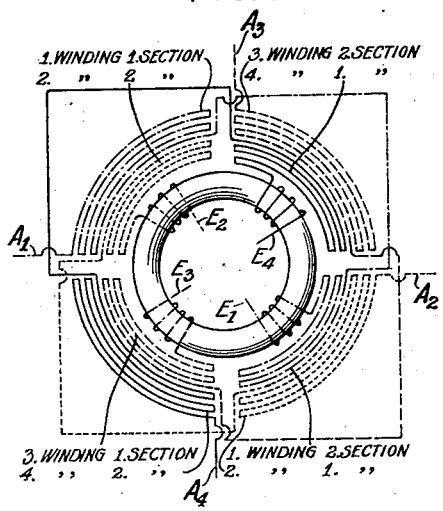
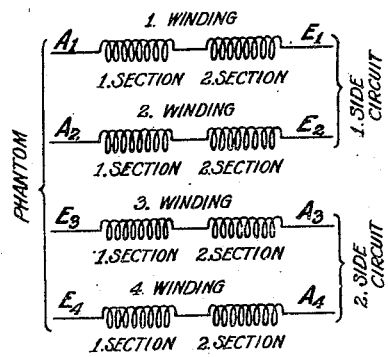
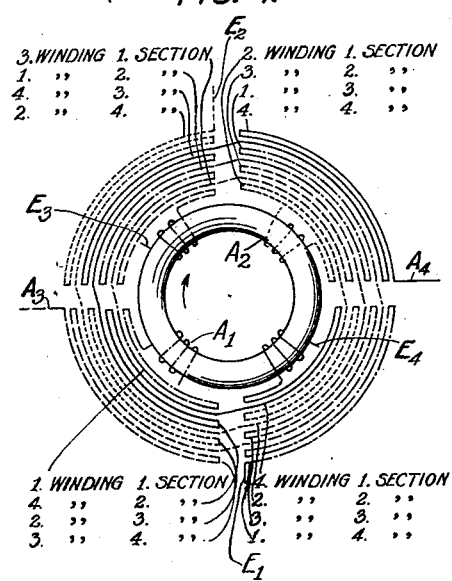
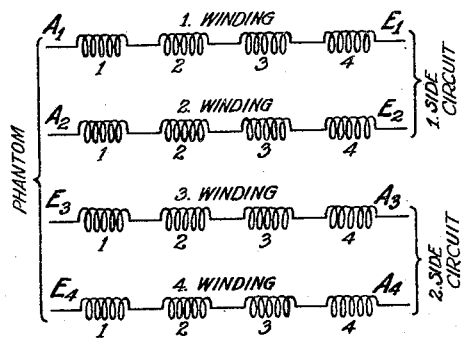
INVENTORS:
PAUL THOMAS
FRITZ FISCHER
By W. Griggs
ATTORNEY June 24, 1930.    P. THOMAS ET AL    1,768,274
INDUCTANCE DEVICE FOR LOADING PHANTOM CIRCUITS
Filed April 23, 1927    2 Sheets-Sheet 2
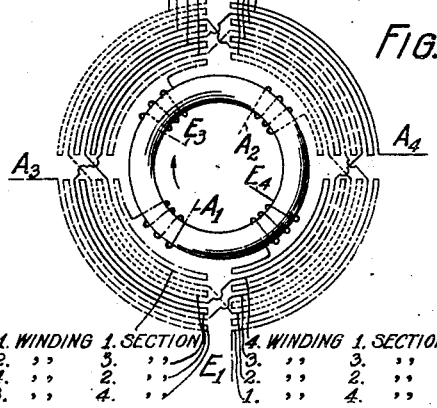
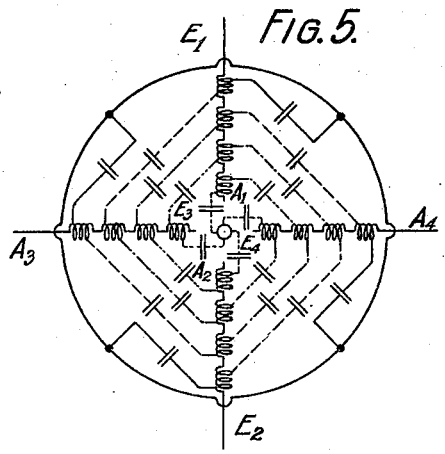
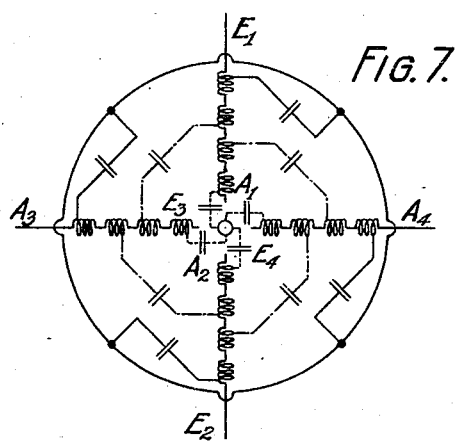
INVENTORS:
PAUL THOMAS
FRITZ FISCHER
BY
ATTORNEY Patented June 24, 1930

1,768,274

UNITED STATES PATENT OFFICE

PAUL THOMAS, OF NEW COLOGNE, BERLIN, AND FRITZ FISCHER, OF CHARLOTTENBURG, BERLIN, GERMANY, ASSIGNORS TO SIEMENS & HALSKE AKTIENGESELLSCHAFT, OF SIEMENSSTADT, NEAR BERLIN, GERMANY, A CORPORATION OF GERMANY

INDUCTANCE DEVICE FOR LOADING PHANTOM CIRCUITS

Application filed April 23, 1927, Serial No. 185,959, and in Germany May 19, 1926.

This invention relates to inductance devices and more especially to loading coils for phantom circuits.

In order to load phantom circuits it is customary to use self-induction coils in which the magnetizing windings belonging to the four conductors of the phantom circuit are divided into winding sections which are arranged symmetrically on an annular iron core.

In these coils the winding of each conductor is divided into two sections and the winding sections are so distributed over the core ring that the sections of the conductors of a side circuit are arranged on diametrically opposite quarters of the core, so that on one part of the core one winding section of one winding surrounds one winding section of another winding and on the diametrically opposite part of the core, the other winding section of said other winding surrounds the other winding section of said one winding. The winding sections are then so connected that, when the side circuits are used as a metallic circuit, the effective self-inductance of the coil does not increase, while during phantom operation, the desired self-inductance is introduced into the transmission circuits.

Figs. 1 and 2 of the drawing illustrate schematically these known winding arrangements, Fig. 1 showing the distribution of the winding sections on the quarters of the core, and Fig. 2 illustrating the connections of the windings and winding sections to form the phantom circuit.

If, with the mode of winding shown for phantom loading coils, the respective winding sections have equal numbers of turns and equal impedance, and are also distributed symmetrically over the core, there still occur, however, magnetic stray fields, because the winding of a conductor does not completely surround the core, but is divided into two winding sections on two opposite quarters of the core. The stray fields which are still present lead to an increase of the coil impedance by energy losses in the outer metallic casing, and are conducive to disturbing cross-talk phenomena through the inductive action on the adjacent coils of other circuits.

It is the purpose of the invention to eliminate these stray fields by a new method of winding. According to the invention the winding of each conductor of a phantom circuit is divided into a number of winding sections divisible by four and the winding sections of a phantom coil are distributed over the core quarters in such a manner that on each quarter of the core, winding sections of all four windings of the conductors of the phantom circuit are arranged uniformly.

When connecting the winding sections together and inserting them in the conductors of the phantom circuit, the capacities of each winding section with respect to the core and the metallic casing as well as with respect to adjacent winding sections must be taken into account. These unavoidable capacities may lead to cross-talk owing to electrostatic equalizing actions. In order to prevent this it is necessary to distribute the capacities symmetrically with respect to the conductors. By way of example, some forms of distribution of the coil windings according to the invention, and having this property, will be described. Fig. 4 illustrates one scheme of distributing the winding sections of the four conductors of the phantomed circuit on an annular core in accordance with the invention, and Fig. 3 illustrates the connections of the windings and winding sections of the coil of Fig. 4 to form the phantom circuit.

The winding of each conductor of the phantom circuit is divided into four winding sections. If the winding sections of the windings for the conductors of one side circuit are numbered from their inner ends ($A_1$, $A_2$) and those of the other side circuit from their inner ends ($E_3$, $E_4$) as is shown in Fig. 4, it will be noted that the first section of each winding lies next to the core. The windings begin at four points distributed uniformly over the core ring in which the windings of each side circuit are at opposite points. The four winding sections are wound in the same direction along the core, that is, in the direction of the circumference thereof, this being indicated by the arrow, but the direction of winding for the turns of one side circuit ($A_1$, $E_1$, $A_2$, $E_2$) is in the opposite direction to the windings of the other side circuit ($E_3$, $A_3$, $E_4$, $A_4$), as indicated in Fig. 4 by the direction of the winding turns of the inner winding sections of each side circuit around the core.

The second section of each winding lies above the first winding sections, but always displaced by a distance equal to a quarter of a core in the same direction of winding with respect to the core ring, this being likewise indicated by the arrow. In the same way the third and fourth winding sections are applied so that they lie over the second and third winding sections, respectively, but are always staggered with respect to the preceding sections of the same winding by a distance equal to a quarter of the core and always in the same direction. Each winding section can consist of one or several layers. From the above description and reference to Fig. 4, it will be seen that four winding sections are situated in each quarter of the core, and that each winding is wound over the entire core.

The distribution of the deleterious capacities between adjacent windings of different side circuits as well as between the windings and the core, and also between the winding and the casing is shown in Fig. 5. This figure shows that these capacities are distributed perfectly symmetrically.

With the mode of winding proposed, the number of capacities is fairly great, which is a disadvantage, because the possibility of capacity unbalance during manufacture increases with the number of component capacities and the balancing of the component capacities by the method of winding described above is correspondingly inconvenient.

In order to reduce the number of component capacities the winding sections are distributed over the core in accordance with another embodiment of the invention so that, while the same winding principle is adopted as in the first embodiment described, the second winding section of each winding is substituted on the quarter of the core in the space occupied by the third section in said first embodiment, with respect to its spacing from the core, and the third winding section is substituted for the second section, with respect to core spacing.

The winding scheme just described is shown in Fig. 6, and the reduction in the number of the deleterious component capacities obtained by its use is shown in Fig. 7. As indicated in Fig. 7, except for the unavoidable capacities of the inner winding sections with respect to the core and the outer sections with respect to the casing there only occur harmful component capacities between the winding sections which are second and third with respect to the core spacing and which belong to the different side circuits; hence, all capacities are again symmetrically distributed.

A further development of the invention consists in the sub-division of the windings for each conductor into a greater number of winding sections, which are uniformly distributed around the four quarters of the core in the manner described above, the number of winding sections in each winding always amounting to a whole multiple of four, whereby several windings of the described construction can then be applied on the core, side by side and on top of each other.

What is claimed is:

1. Induction coil for loading phantomed circuits having its windings distributed symmetrically over an annular core, the coil winding for each of the four conductors of the phantomed circuit being divided into sections, the successive sections being applied in the same direction advancing in order over consecutive quarters of the core, so that each winding is equally distributed on all quarters of the core, the winding sections for each winding being so wound that the winding direction of the sections allotted to one side circuit of the phantomed circuit is opposite to the winding direction of the sections allotted to the other side circuit, whereby for the phantom circuit currents the magnetizing ampere turns of the coil add together while for the side circuit currents the magnetizing ampere turns are neutralized.

2. Induction coil in accordance with claim 1, in which the coil windings belonging to each of the four conductors of the phantomed circuit comprise four winding sections each, which winding sections are uniformly distributed over the quarters of the core, a winding section in one or more layers for each coil winding being situated over each quarter of the core, so that each winding surrounds the entire core.

3. Induction coil in accordance with claim 1, in which the winding of each conductor of the phantomed circuit comprises four winding sections which are uniformly distributed over the quarters of the core, the winding sections for each winding being wound so that the first winding section in the coil lies next adjacent to the core and the succeeding sections are applied in the same direction advancing over the consecutive quarters of the core, where, with respect to their spacing from the core, they form the second, third and fourth winding sections, respectively, wound over consecutive quarters of the core.

4. Induction coil in accordance with claim 1, in which the winding of each conductor of the phantomed circuit comprises four winding sections which are uniformly distributed over the quarters of the core, the winding sections for each winding being wound so that the first winding section lies next adjacent to one quarter of the core, and the succeeding sections are applied in the same direction advancing over the consecutive quarters of the core, where, with respect to their spacing from the core, they form the third, second and fourth winding sections, respectively, wound over consecutive quarters of the core.

5. Induction coil in accordance with claim 1, in which the number of the winding sections of the winding for each conductor is a complete multiple of 4, the successive sections of each winding of the coil being applied to consecutive quarters of the core over and adjacent to any previously applied sections of the windings, so that each winding surrounds the entire core.

In witness whereof, we hereunto subscribe our names this 23rd day of March A. D., 1927.

PAUL THOMAS.
FRITZ FISCHER.